Oct. 12, 1937.    W. G. LUNDQUIST ET AL    2,095,757
DYNAMIC DAMPER
Filed April 14, 1936
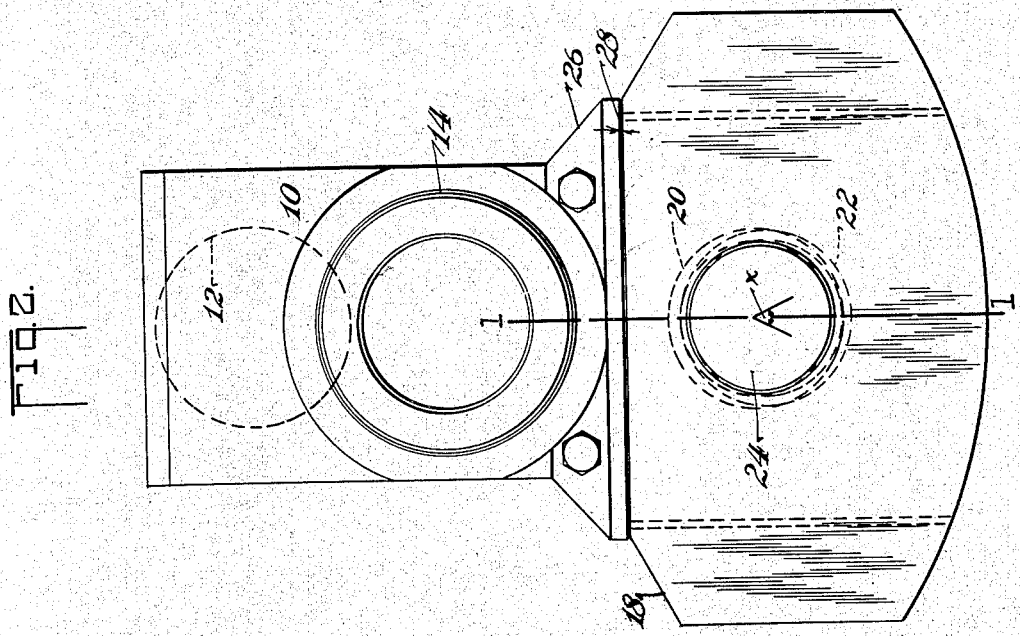
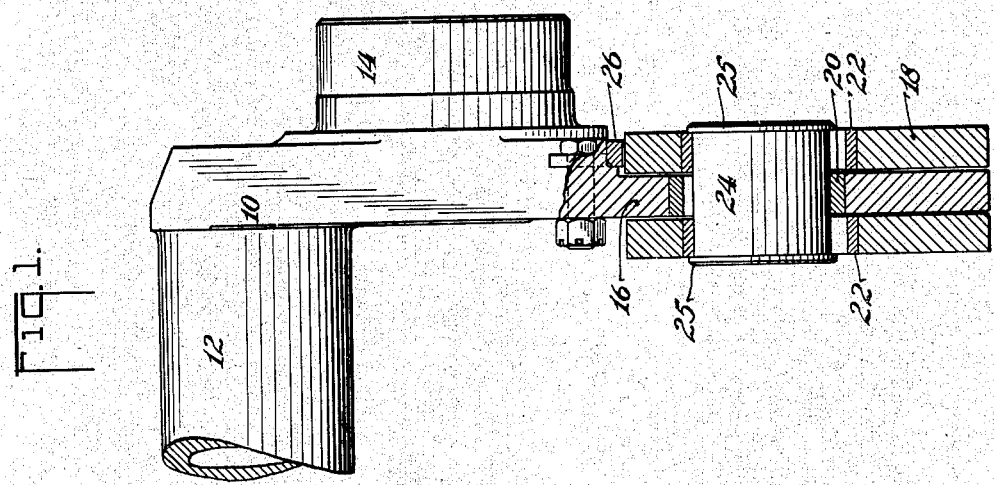
INVENTOR.
Wilton G. Lundquist and John E. Weiss.
BY
ATTORNEY.

Patented Oct. 12, 1937

2,095,757

UNITED STATES PATENT OFFICE 2,095,757

DYNAMIC DAMPER

Wilton G. Lundquist, Glen Rock, and John E. Weiss, Nutley, N. J., assignors to Wright Aeronautical Corporation, a corporation of New York Application April 14, 1936, Serial No. 74,280

6 Claims. (Cl. 74—604)

This invention relates to means for counteracting torsional vibrations in crankshaft systems, and in certain aspects comprises improvements in the co-pending application of Roland Chilton, Serial No. 7,475, filed February 21, 1935.

The pending application discloses novel means for utilizing the principle that the frequency of a pendulum attached to a rotating body, so as to be stabilized by centrifugal force, increases with the speed of revolution so that the pendulum makes a constant number of swings per revolution at all speeds. Thus, an engine having a disturbing force of 4½ impulses per revolution being equipped with a pendulum having this frequency, the pendulum will automatically swing 180 degrees out-of-phase with the exciting impulses which are thereby neutralized.

Frequencies of the order of 4½ swings per revolution cannot be obtained in practice with a pendulum mass conventionally supported to oscillate about a single point, because the maximum obtainable rate of oscillation with such "compound" pendulums is that obtained when the pivot point is located at the radius of gyration of the mass, which, with the size of the masses involved in practice, gives much too great a pendulum length and accordingly much too slow a frequency. Accordingly, the above identified pending application shows a novel construction wherein all points in the mass are constrained to swing about paths of identical small radius by suspension on a pair of rollers rollably engaging holes or arcuate tracks, in the mass and in its support; the radius of swing is the difference in diameter of the rollers and the engaged tracks.

This type of damper has gone into extended and successful use in radial aircraft engines where torsiometer records show that it has virtually eliminated the explosion-frequency vibration.

Radial aircraft engines, however, are subject to other impulses such as an engine speed impulse from piston inertia due to the angularity effects of the connecting rods, and this slow speed exciting force has given rise to torsional variations which are objectionable in certain cases and particularly where the drive is taken through a long shaft as, for instance, when the engine is so coupled with an electric dynamometer. For frequencies of this low order of once-per-revolution, a synchronous pendulum may be obtained with a single point of free oscillating support when utilizing the counterweight masses used in these engines.

The foregoing discussion includes two modes of pendulum mass vibration as follows:

(a) Free translational vibration at relatively high frequency of the mass as a whole on a path of small radius, wherein all points of the mass move in identical paths; and (b) Free angular or polar vibration about a single pivot point wherein each element of the mass has a different radius of swing, giving a much lower frequency than in (a).

The prime object of the present invention resides in endowing a single pendulum mass with both modes of vibration, whereby a single mass may be resonant to, and effective against, two different orders of disturbing impulses of high and low frequency, respectively.

Other objects of the invention will be obvious from, or will be pointed out in, the following description with reference to the drawing, in which:

Fig. 1 is a side view of a crankshaft in part section on the line 1—1 of Fig. 2 through the dampening means of the invention; and Fig. 2 is an axial view of Fig. 1.

In these figures, 10 designates the arm of a conventional crankshaft having a usual crankpin 12 and journal 14. The crank arm is extended at 16 opposite the crankpin 12 and is loosely embraced by a counterweight 18. The crank arm 16 and the counterweight 18 have bores provided with bushings 20, 22 loosely engaged by a roller 24 on which the counterweight mass 18 has two modes of vibration as described later. The amplitude of vibration may be limited by a stop bar 26 defining a suitable clearance indicated by the dimension arrows 28, which conveniently is less than the difference in diameter between the bores of the bushings 20, 22, and the pin 24. Said pin is provided with flanges 25 to guard against axial displacement when the bar 26 is applied.

It will now be seen that the counterweight 18 is free to move as follows:

(a) It may move laterally (of Fig. 2) on the arcs defined by the difference in diameter between the rollers 24 and the race-ways 20, 22 as indicated at X (Fig. 2).

(b) It may swing in a polar sense through a limited angle on the roller 24 as a pivot pin as in a conventional pendulum.

With the proportions shown, the pendulum mass 18 will have a much higher frequency in mode (a) than in mode (b) and the proportions may be such that these frequencies are synchronous to two different orders of exciting impulses to which the crankshaft is subject.

Under the (a) mode of vibration alone every point in the weight describes an individual arc of travel of the same radius (indicated at X) and the weight has no angular component of motion since any point on the weight describes the same path of motion in this mode of vibration. However, super-imposed upon this mode of vibration is the slower angular or polar vibration about the single point of support comprised by the roller 24, so that when both modes of vibration are in force, the path of any point on the weight becomes complex. In a 9-cylinder radial engine, for example, there may be 4½ swings of the (a) mode of translational vibration during each swing of the mode (b) angular vibration (assuming that the corresponding impulses were acting simultaneously at one rotational speed).

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. The combination with a crankshaft extension arm having a single bore, of a counterweight loosely engaging the arm and having a similar single bore and a single pin rollably engaging the surfaces of both bores whereby the counterweight is free for pivotal angulation about the pin and for lateral vibration as the pin rolls on the surfaces of said bores.

2. The combination with a crankshaft extension and a counterweight each having single race tracks eccentrically related, of a single pin rollably engaging both said tracks to establish said eccentricity, said single pin providing the sole means of supporting the counterweight on the extension, said weight being accordingly free for oscillation of each element of its mass in the eccentric paths so defined, and also free to angulate about the roller.

3. The combination of a crankshaft extension member, a counterweight member, one embracing the other, said members having a single through bore in each thereof with the bores in eccentric relationship, a single pin rollably engaging the surfaces of both bores, said pin being of lesser diameter than either bore, said members being relatively oscillatable and relatively translatable through roller contact, whereby said counterweight member has one vibration frequency according to its polar movement and another vibration frequency according to its translational movement.

4. In combination, a shaft member, a weight member, one embracing the other, each of said members having a single bore with the bores in eccentric relation, a roller pin rollably engaging the surfaces of both bores, the pin portions engaging in respective bores being of lesser diameter than the respective bores, said members being relatively oscillatable and relatively translatable through roller contact, whereby the weight member has one vibration frequency according to its polar movement and another vibration frequency according to its translational movement relative to the shaft member.

5. The combination of a crankshaft extension member, a counterweight member, one embracing the other, said members having a single through bore in each thereof with bores in eccentric relationship, and single pin means engaging both bores and retaining same in said eccentric relationship, said pin means being movable with and with respect to both members and holding said members for relative translation and rotation.

6. The combination of a crankshaft member, a counterweight, and means for supporting said counterweight for rotation and translation in an arcuate path relative to the member comprising a single pin means rotatable relative to both the member and the counterweight, said member and counterweight having eccentrically related bores within which said pin means is operatively engaged, said pin means being the sole means for supporting said counterweight upon said member against the action of centrifugal force.

WILTON G. LUNDQUIST.
JOHN E. WEISS.